Nov. 8, 1960    H. C. JACOBS    2,959,453
DRILL PIPE PROTECTOR
Filed April 27, 1956    2 Sheets-Sheet 1
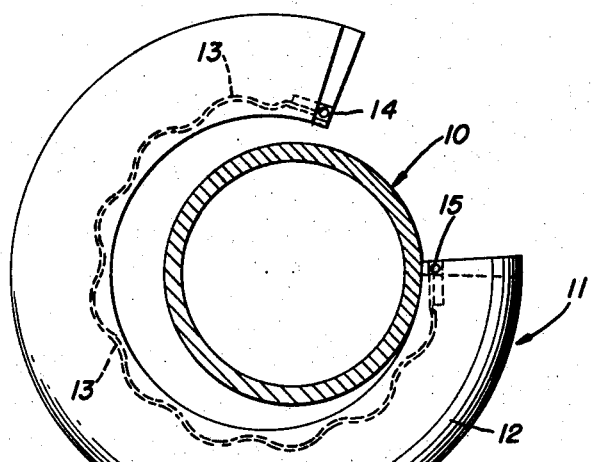
Fig. 1.
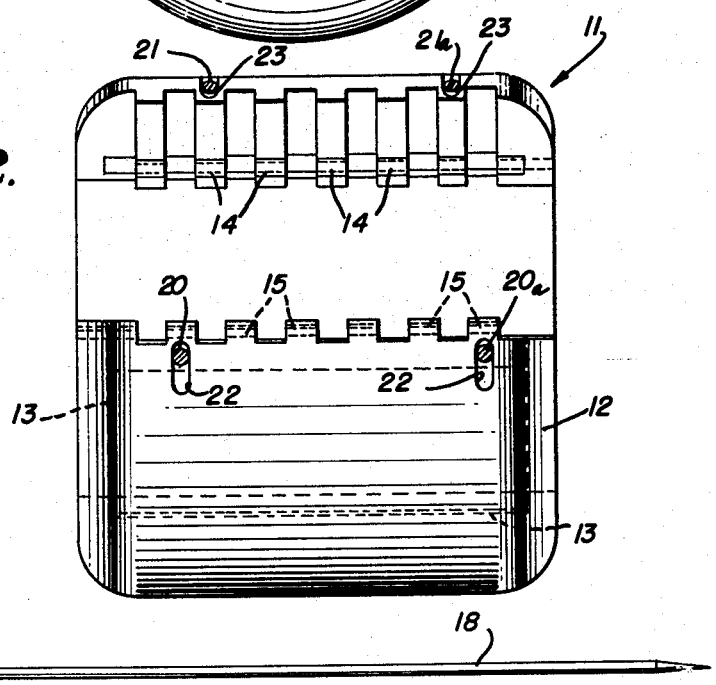
Fig. 2.
Fig. 3.
INVENTOR,
HARVEY C. JACOBS.
BY
Attorney

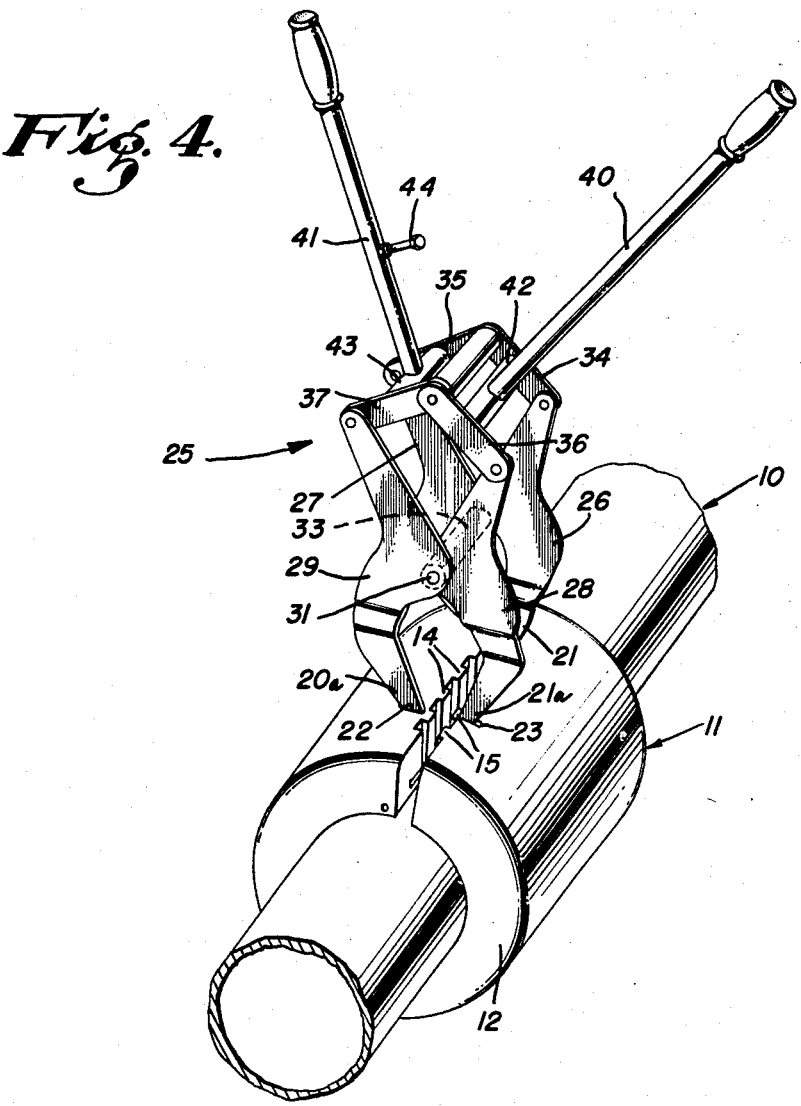

United States Patent Office 2,959,453
Patented Nov. 8, 1960

2,959,453

DRILL PIPE PROTECTOR

Harvey C. Jacobs, 9710 Harvard St., Bellflower, Calif.

Filed Apr. 27, 1956, Ser. No. 581,221

5 Claims. (Cl. 308—4)

The present invention relates to oil well drill pipe protectors and more particularly to an improved drill pipe protector having novel features designed to overcome the deficiencies in prior art type pipe protectors.

Drill pipe protectors have been known to the prior art in the form of rubber protector rings and the like designed to protect the well casing and the couplings of a string of drill pipe. The drill pipe protectors as known to the prior art have presented certain short-comings and deficiencies which are overcome by the protector of this invention.

With respect to a drill pipe protector in the form simply of a rubber ring of material, the material must be expanded to clear the coupling when placed on the pipe string. Thus, it must be made of material which is sufficiently elastic to allow the stretching and elongation necessary to get it over the coupling. Thus, if the material possesses a characteristic which is suitable in this respect it is likely that the material will not have sufficient abrasive resistance when it is in place over a coupling or on a part of the pipe string. This type of prior art pipe protector also requires a rather elaborate type of hydraulic tool involving a mandrel for installing the protector on the pipe string. The nature of the protector, that is, this particular prior art protector, is also such that in order to remove it, it must be destroyed; in other words, it cannot be removed and used again.

In another type of prior art pipe protector, the protector is of the split type which is clamped about the pipe requiring some type of friction lock for drawing the clamping members together to provide the necessary clamping force on the pipe. This prior art device is dependent on some type of friction mechanism which is subject to certain deficiencies and limitations which are overcome by the present invention.

The protector of this invention can be opened to install it on the pipe string and thus it is not required that the joint or coupling in the pipe string be opened. It involves a ring of rubber or other suitable material having a marcelled steel spring molded into the rubber, the steel spring and material of the protector being capable of elongation to fit joints or pipe members having variations in tolerances. It has the advantage that the clamping power is not dependent on the elasticity of the rubber material but rather upon the strength of the spring. In installed position the marcelled spring is stretched; the stretched marcelled spring compresses and extrudes the rubber or other material against the pipe and the device can be designed for any desired gripping force determined by the spring.

A simple tool on the order of a bolt cutter is provided for closing the protector for installation, eliminating the need for elaborate mechanisms for so doing. The protector features a piano hinge associated with the steel spring providing for a positive lock for locking the protector in place with a lock pin providing for multiple shear of the pin in locking position. This eliminates cam type friction locking devices or eccentrics which are subject to failure and the deficiency that they require a take up mechanism for pipes or couplings having variations in tolerances. The nature of the protector is such that it can be designed to meet any particular requirements or characteristics and to have whatever gripping force may be necessary. This eliminates the disadvantage of prior art devices that at times the pressure of the drilling fluid in the pipe casing and the cuttings would push the protectors away from their installed positions and shove them along the pipe string such that at times a single section of pipe might be withdrawn with a number of protectors on it. The protector adapts itself to a design wherein the rubber material on the inside of the protector may be a type having a very high coefficient of friction to facilitate its gripping the pipe and the material on the outside may have a low coefficient of friction adapting it to have the desired bushing effect.

The protectors of this invention as pointed out can be easily removed by the tool provided and used again. Furthermore, it is common that the pipe string may extend in the drill hole below the extent of the casing and it is desired that the drill protectors be removed on the part of the pipe string below the casing. With this invention the drill protectors can readily be removed from the lower part of the string and reinstalled at points higher up on the pipe string. Thus, a smaller total number of drill protectors is required.

In accordance with the foregoing it is an object of this invention to provide a novel protector ring which can be removed and reinstalled to successfully grip various pipes or couplings.

It is another object of the invention to provide an improved drill protector of a type which can be opened to be installed, the protector being formed of rubber or like material and having a steel marcelled spring molded into it.

Another object of the invention is to provide a drill protector as in the foregoing object wherein the protector is locked in position by way of a piano hinge utilizing a locking pin associated therewith.

Another object of the invention is to provide a drill protector as in the foregoing object which may be installed on the pipe string by means of a tool on the order of a bolt cutter. Such a tool is one operated manually by handles and having a very high mechanical advantage whereby sufficient forces may be produced for drawing together the drill protector having the steel spring in it for installation.

Further objects and numerous advantages of the invention will become apparent from the following detailed description and annexed drawings wherein:

Fig. 1 is an end view of the invention;

Fig. 2 is an elevational view of the pipe protector showing the piano hinge structure for locking it in installed position;

Fig. 3 is a detailed view of the locking pin for the protector; and

Fig. 4 is a perspective view of the installation tool in position for installing the protector.

Referring now to Fig. 1 of the drawings, numeral 10 designates a section of drill pipe. The drill pipe protector is shown generally at 11. It comprises a cylindrical ring of suitable material which may be rubber having the desired characteristics. This ring is longitudinally split to form a body member as shown at 12. If desired, the inner part of the ring may be made of rubber having a different coefficient of friction than the material of the outer part of the ring. The protector, that is, the ring, has a depth along the pipe string in proportion as may be seen in Fig. 2. Molded into the material of body member 12 is a steel split sleeve which is a marcelled spring as shown at 13. In other words, this spring as shown at 13 has a sinusoidal wave formation in it as may be seen in Fig. 1. The spring is made of steel having the desired characteristics of resiliency and ability to elongate and to exert the desired gripping force on the pipe once the protector is in position. The split sleeve has a width substantially coextensive with the width of the body member. The sleeve has circumferentially spaced resilient portions extending inwardly toward the inner periphery of the body member which, in the specifically illustrated embodiment, are provided by the sinusoidal wave formation of the spring. These spaced resilient portions are joined by outer portions of the sleeve disposed outwardly of the inner periphery of the body member a greater distance than the spaced portions to make the sleeve between its ends substantially continuous, such as also represented in the illustrated sinusoidal wave formation spring type of sleeve. At the extremities of the spring 13 it has a structural formation whereby a piano hinge is formed to provide connector means whereby it may be locked about the pipe 10. This piano hinge is of the usual type being formed of extending hooks, that is, projections or fingers, as shown at 14, at one end of the spring and at 15 at the other end of the spring which interleave with each other. The interleaving parts of the piano hinge may be attached by welding to the ends of the marcelled spring. When the protector is opened and then drawn together tightly about the pipe in a manner which will be described, the locking pin 18 is inserted longitudinally through holes in the fingers or hook members 14 and 15 at the ends of the spring to positively lock the protector in place.

To install the protector it is opened and placed about the pipe or coupling at the desired point and to draw the ends of the protector together a tool is used, as shown in Fig. 4, which is on the order of a bolt cutter. The tool is operated manually by a pair of handles and it has extending members which are arranged to provide for a very high mechanical advantage, that is, very large forces can be produced for drawing the ends of the protector together. The tool has extending portions which engage the ends of the protector at upper and lower points, the projecting portions of the tool being indicated at 20 and 21, of Fig. 2. The tool extends through openings in the material of the protector and it engages in slots as shown at 22 and 23 formed in the material of the spring 13 and the piano hinge. When the handles of the tool are operated the protector is drawn together, that is, its ends are drawn together by the force applied to the spring 13 and when the hooks or projections 14 and 15 of the piano hinge come into juxtaposed position, the locking pin is inserted longitudinally which causes the piano hinge to lock, that is, the ends of the spring 13 are positively locked together and the protector is then in installed position. In installed position the ends of the protector, of course, come into close abutting relationship.

Referring to Fig. 4 of the drawings, this figure shows a perspective view of the pipe protector 11 with the installation tool in place having just drawn the protector into installed position. The tool is designated generally by the numeral 25. Referring to the installation tool, it will be observed that it comprises an upper pair of pivoted links or jaw members 26 and 27 having toes 20 and 21 and a lower pair of pivoted links or jaw members 28 and 29 having toes 20a and 21a. The links or jaw members 26 and 27 are pivoted together on a stem 31 and the lower links or jaw members 28 and 29 are similarly pivoted together on this stem which extends through a cylindrical post 33, as shown, separating the upper and lower pairs of jaw members. The toe members 20 and 21 are shown in open position and in this position the other ends of the jaw members 26 and 27 and 28 and 29 are spaced as shown in the drawings. The other ends of the links or jaws 26 and 27 are pivotally attached to similar link members 34 and 35, as shown. The links or jaw members 28 and 29 are pivotally attached to a similar pair of link members 36 and 37. The links 34 and 35 are pivoted together at their inner ends as shown and the links 36 and 37 are pivoted together at their inner ends as shown.

The tool is operated by a pair of operating handles 40 and 41 as shown. The handle 40 is attached to a cylindrical post 42 as shown, which extends between intermediate portions of the links 34 and 36 and is rigidly attached to these links. The handle 41 is attached to a similar cylindrical post 43 which extends between intermediate points of the links 35 and 37 as shown and is rigidly attached to these links. The limit position of the handles 40 and 41 is determined by a stop comprising a bolt 44 having a nut which is welded to the handle 41 and the head of which forms an abutment which limits the movement of the handles toward each other.

In the operation of the tool 25 when the handles 40 and 41 are manually spread apart, the toes 20 and 21 of the respective jaw members open, that is, they spread apart. In this operation the joint at the inner ends of the respective link members 34 and 35 and 36 and 37 moves upwardly as shown in Fig. 4. When the handles 40 and 41 are brought together, the joint at the inner ends of the respective link members 34 and 35 and 36 and 37 moves downwardly to a dead center or straight line position and slightly beyond this position in which position the handle 40 is against the stop described. In this operation, the toes 20 and 21 at the ends of the respective jaw members come together and as can be seen, the linkage provides a very large mechanical advantage such that the toes 20 and 21 pull the pipe protector into installed position with a very considerable amount of force such that the piano hinge can be attached or fastened. As can be readily seen, when the joint at the inner ends of the links 34 and 35 and 36 and 37 moves overcenter, the tool locks in that position, no further force being required to be applied to the handles to keep it in that position. As can be readily observed, the force of the pipe protector tending to spread the toes 20 and 21 apart serves merely to further urge the tool into the aforesaid overcenter position and to hold it there.

The limiting stop bolt 44 can be adjusted simply by adjusting it in its nut.

It can be seen that with the above manner of installation the protector can be removed in the same manner using the same tool to relieve the stress on the piano hinge, at which time the locking pin 18 can be freely removed.

From the foregoing it can be seen that when the protector is installed the steel spring elongates as does the protector itself, increasing the gripping area and it can be seen that the gripping force is provided by the spring rather than by the rubber material itself. The design of the protector, particularly as respects the steel spring 13, permits of a wide range and great flexibility in design so that a protector having any desired characteristics can be produced. It can be designed to have any desired ultimate gripping force so that there is no danger of the protector being pushed out of position once it is installed. Nevertheless, the protector, as pointed out, can be readily removed and reinstalled in different positions, that is, used again.

Once the protector is installed it is positively locked in position as desired and the lock is not dependent upon friction elements such as cams or eccentrics.

From the foregoing, those skilled in the art will observe that I have provided an improved drill pipe protector having unusual characteristics and adaptability, particularly in that it provides for gripping force which is dependent upon the steel spring within the protector and which can be designed at will to provide a desired gripping force. The protector, as explained, is not subject to the deficiencies of the prior art and can be readily removed, reinstalled and used again.

The foregoing disclosure is representative of a preferred form of the invention. It is to be understood that various modifications and alternatives may be adapted by those skilled in the art and it is intended that all such variations and modifications shall come within the scope of the claims appended hereto.

I claim:

1. A drill pipe protector comprising a cylindrical split body member of elastic material having an internal diameter less than the external diameter of the drill pipe with which it is to be used, said body member further having embedded therein between the inner and outer surfaces of said body member a metal spring of generally sinusoidal wave formation throughout its width whereby it is capable of stretching longitudinally, said spring being of cylindrical configuration, said spring being substantialy coextensive in width with said body member, said sinusoidal wave formation providing circumferentially spaced resilient portions extending closer to the inner periphery of said body member than do the intervening portions of said spring, and said spring having means whereby the body member can be drawn about a pipe and the ends of the spring member locked together.

2. A drill pipe protector comprising a cylindrical split body member of elastic material having an internal diameter less than the external diameter of the drill pipe with which it is to be used, said body member further having embedded therein between the inner and outer surfaces of said body member a resilient and longitudinally extensible metal spring, said spring having a generally longitudinal sinusoidal wave formation throughout its width, said spring being substantially coextensive in width with said body member, said sinusoidal wave formation providing circumferentially spaced resilient portions extending closer to the inner periphery of said body member than do the intervening portions of said spring, said body member being separable whereby to be placed about a pipe such that a gripping force is applied to the pipe, and means formed at the ends of said spring for positively locking the ends of the body member together.

3. Well drilling apparatus comprising, in combination with a metallic drill pipe rotatably disposed in and of less diameter than a metallic well casing, protector means for preventing said pipe from having metal-to-metal engagement with said casing during rotation of said pipe, comprising a cylindrical split body member of elastic material having an internal diameter less than the external diameter of the drill pipe with which it is to be used, said body member further having embedded therein between the inner and outer surfaces of said body member a metal spring of generally sinusoidal wave formation throughout its width whereby it is capable of stretching longitudinally, said spring being of cylindrical configuration, said spring being substantially coextensive in width with said body member, said sinusoidal wave formation providing circumferentially spaced resilient portions extending closer to the inner periphery of said body member than do the intervening portions of said spring, and said spring having means whereby the body member can be drawn about said drill pipe and the ends of the spring member locked together.

4. A drill pipe protector frictionally engageable around a metallic oil well drill pipe to prevent metal-to-metal engagement of said pipe with a metallic well casing during rotation of said pipe within said casing, comprising a longitudinally split generally cylindrical body member of elastic material, a split sleeve embedded in said body member between the inner and outer peripheries of said body member and having a width substantially coextensive with the width of said body member, connector means at the opposite ends of said split sleeve engageable to interconnect the ends of said body member and the ends of said sleeve with the inner periphery of said body member providing a bore of a diameter less than the diameter of the drill pipe with which it is engageable, said sleeve having circumferentially spaced resilient portions extending inwardly toward the inner periphery of said body member and having outer portions joining said spaced portions to make said sleeve between its ends substantially continuous, said outer portions being disposed outwardly of said inner periphery a greater distance than said spaced portions, said spaced portions being in resilient pressure responsive relationship with the elastic material of said body member outwardly thereof and with the outer periphery of said body member when said outer periphery engages said casing during the rotation of said pipe to keep the elastic material of said body member inwardly of said spaced portions in substantial resilient engagement with the drill pipe to maintain said protector means secure against displacement along the drill pipe.

5. Well drilling apparatus comprising, in combination with a metallic drill pipe rotatably disposed in and of less diameter than a metallic well casing, protector means for preventing said pipe from having metal-to-metal engagement with said casing during rotation of said pipe, comprising a longitudinally split generally cylindrical body member of elastic material, a split sleeve embedded in said body member between the inner and outer peripheries of said body member and having a width substantially coextensive with the width of said body member, connector means at the opposite ends of said sleeve engageable to interconnect the ends of said body member and the ends of said sleeve with the inner periphery of said body member providing a bore of a diameter less than the external diameter of said pipe, said sleeve having circumferentially spaced resilient portions extending inwardly toward the inner periphery of said body member and having outer portions joining said spaced portions to make said sleeve between its ends substantially continuous, said outer portions being disposed outwardly of said inner periphery a greater distance than said spaced portions, said spaced portions being in resilient pressure responsive relationship with the elastic material of said body member outwardly thereof and with the outer periphery of said body member when said outer periphery engages said casing during the rotation of said pipe to keep the elastic material of said body member inwardly of said spaced portions in substantial resilient engagement with said drill pipe to maintain said protector means secure against displacement along said drill pipe.

References Cited in the file of this patent

UNITED STATES PATENTS

| | | |
|---|---|---|
| 1,636,492 | Taylor | July 19, 1927 |
| 1,838,164 | Tannewitz | Dec. 29, 1931 |
| 1,907,012 | Smith | May 2, 1933 |
| 1,994,819 | Hartson | Mar. 19, 1935 |
| 2,002,893 | Holt et al. | May 28, 1935 |
| 2,197,531 | Smith | Apr. 16, 1940 |
| 2,251,428 | Smith | Aug. 5, 1941 |
| 2,628,134 | Williams et al. | Feb. 10, 1953 |
| 2,636,787 | Medearis | Apr. 28, 1953 |